Patented Mar. 1, 1938

2,109,573

UNITED STATES PATENT OFFICE 2,109,573

MODIFIED RESIN COMPOSITION

Barnard M. Marks, Arlington, N. J., assignor, by mesne assignments, to E. I. du Pont de Nemours & Company, Wilmington, Del., a corporation of Delaware No Drawing. Application July 15, 1936,
Serial No. 90,729

3 Claims. (Cl. 106—22)

This invention relates to modified resin compositions and, more particularly, to plasticized polyvinyl acetal resins. This application is a continuation-in-part of applicant's copending application Serial No. 733,239, filed June 30, 1934, entitled "Modified compositions".

Polyvinyl acetal resins are a well known group of resins in general obtained by reacting polyvinyl alcohol with an aldehyde. Polyvinyl alcohol is usually obtained from a polyvinyl ester, such as polyvinyl acetate, by hydrolysis and the polyvinyl acetal resin may be formed by a one stage process in which hydrolysis of the polyvinyl ester and reaction of the polyvinyl alcohol thus formed, with an aldehyde, are carried out substantially simultaneously. Alternatively, the two reactions may be carried out in two separate stages. The hydrolysis of the polyvinyl ester may not be complete so that some acetyl radicals still persist in the polyvinyl acetal resin formed, affecting the properties of the resin to some extent. Detailed disclosure of these polyvinyl acetal resins and their preparation is found in United States Patent 2,036,092.

An object of the present invention is to provide new modified compositions comprising polyvinyl acetal resins and, as plasticizers or high boiling solvents therefor, esters which are highly compatible with the ordinary ingredients used in the coating, film, and plastic arts, which esters have low vapor pressures and otherwise acceptable properties. A further object is to provide new polyvinyl acetal compositions. Other objects will be apparent from the description of the invention given hereinafter.

The above objects are accomplished according to the present invention by employing, as a modifier in polyvinyl acetal resin compositions, an ether derivative of an ester of a hydroxy monocarboxylic acid represented by the formula $R_1OR_2COOR_3$, where $R_1$ is an aryl or aralkyl radical containing not more than 10 carbon atoms, $R_2$ is a divalent hydrocarbon radical containing not more than 17 carbon atoms, and $R_3$ is a monovalent radical derived from a hydroxyl compound of the class consisting of alcohols and phenols containing not more than 18 carbon atoms, and the sum of the carbon atoms of $R_2$ and $R_3$ does not exceed 25. Preferably the sum of the carbon atoms of $R_2$ and $R_3$ should not exceed 12.

These ether derivatives may be prepared by reacting the desired ester of the hydroxy monocarboxylic acid with sodium and then reacting the sodium derivative with a halide of the desired hydrocarbon radical represented by $R_1$ in the above formula. Also the halogenated ester such as ethyl- alpha- or beta-chlorpropionate, or the like, may be reacted with the sodium derivative of the desired alcohol, or phenol.

Among the ether derivatives herein used as modifiers, benzyl ether of ethyl lactate, having a boiling point of approximately 235° C. at 760 mm., benzyl ether of ethyl glycollate, boiling point 155° C. at 21 mm., and phenyl ether of ethoxy butyrate, boiling point 190° C. at 23 mm., are particularly well adapted as plasticizers for the polyvinyl acetal resins. All of these ether derivatives are suitable as modifying agents for polyvinyl acetal resins.

In the formula representing these ether derivatives $R_1OR_2COOR_3$, $R_1$ is an aryl or aralkyl radical containing not more than 10 carbon atoms. Specific examples of such radicals are phenyl, tolyl, xylyl, chlorophenyl, chlorotolyl, benzyl, and phenylethyl radicals. $R_2$ is a divalent hydrocarbon radical containing not more than 17 carbon atoms, examples of which are $-CH_2-$ to $-C_{17}H_{34}-$, including the various iso and branched chain analogues, as

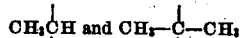

and $R_3$ is a monovalent radical derived from a hydroxyl compound of the class consisting of phenols and alcohols containing not more than 18 carbon atoms. Such radicals are exemplified by $CH_3-$ to $C_{18}H_{37}-$, derived from both branched chain and straight chain primary and secondary alcohols, methoxyethyl and similar lower alkoxyalkyls and phenyl, benzyl, phenylethyl, tolyl radicals, and the like.

The ether derivatives coming within the present invention are only those wherein the sum of the carbon atoms in $R_2$ and $R_3$ do not exceed 25. For example, when $R_2$ is $-C_{17}H_{34}-$, $R_3$ must not be higher than $C_8H_{17}-$; or where $R_3$ is $C_{18}H_{35}-$, $R_2$ must not be higher than $-C_7H_{14}-$, and the highest molecular weight compound would be: $C_{10}H_{13}OC_7H_{14}COOC_{18}H_{37}$ or, $C_{10}H_{13}OC_{17}H_{34}COOC_8H_{17}$.

Compounds having a higher molecular weight than the above are not practically operative in the present invention because of their waxy nature and lack of compatibility with the polyvinyl acetal resins. Furthermore, it is preferred that the sum of the carbon atoms of $R_2$ and $R_3$ should not exceed 12.

All of the ether derivatives herein included are high boiling substantially colorless liquids or substantially white solids compatible with the usual solvents, diluents, and the like, used in the coating and plastics arts. Further, they are practically insoluble in water, and relatively stable toward hydrolysis.

In making the polyvinyl acetal resin compositions employing the ether derivatives of the present invention, the compositions, whether plastics or solutions, may be made up in any of the usual ways of the art, the introduction of the particular modifiers herein described not necessitating departures from the standard practice. Thus, the modifiers may be worked with the polyvinyl acetal resin in a mixer with a small amount of solvent or the polyvinyl acetal resin and modifier, either initially or after being made into a plastic, may be dissolved in a large amount of solvent to give a solution, or "dope", and the like, the modifier being a colloiding agent for the resin.

In working up plastics after mixing of the ingredients, the plastic may be filtered, vacuum mixed, cake pressed, sheeted, and seasoned in accordance with standard practice. Likewise, dopes may be used in casting films and for coating compositions while the plastics may be used in molding compositions, as well as in the manner described above.

In order to illustrate the present invention, the following examples are given, parts being by weight:—

Example 1

| | Parts |
|---|---|
| Polyvinl formal resin | 100 |
| Benzyl ether of ethyl lactate | 50 |
| Alcohol | 80 |

This composition is adapted to be colloided and extruded under pressure through an orifice to give sheets, or the like.

Example 2

| | Parts |
|---|---|
| Polyvinyl acetal resin | 100 |
| Benzyl ether of ethyl glycollate | 15 |
| Pigment (as desired) | |

This composition is adapted to be mixed either with solvent in a Werner-Pfleiderer mixer, or without solvent in a Banbury mixer, or on hot rolls. The plastic may be comminuted and in that form is adapted for molding either by compression molding or by injection molding.

Example 3

| | Parts |
|---|---|
| Polyvinyl isobutal resin | 100 |
| Benzyl ether of ethyl lactate | 60 |
| Alcohol | 150 |
| Water | 15 |

This composition is adapted to be handled substantially according to the technique used with cellulose nitrate plastics and may be cake pressed and sheeted or extruded.

Example 4

| | Parts |
|---|---|
| Polyvinyl formal resin | 200 |
| Phenyl ether of ethyloxybutyrate | 25 |
| Alcohol | 70 |
| Water | 30 |
| Asbestos | 150 |

This composition is particularly adapted to be mixed on hot rolls, then ground in a three-roll mill to provide a granulated product adapted for use as a molding compound.

Example 5

| | Parts |
|---|---|
| Polyvinyl acetal | 100 |
| Ethyl ether of benzyl glycollate | 40 |
| Alcohol | 250 |

This composition gives a dope to be used for impregnating a paper or cloth which is subsequently to be molded.

Example 6

| | Parts |
|---|---|
| Polyvinyl formal resin | 100 |
| Cyclo hexyl ether of ethyl oxyisobutyrate | 40 |
| Alcohol | 90 |

Example 7

| | Parts |
|---|---|
| Polyvinyl acetal resin | 200 |
| Ethyl ether of benzyl lactate | 90 |
| Alcohol | 150 |

Example 8

| | Parts |
|---|---|
| Polyvinyl isobutal resin | 1000 |
| Benzyl ether of ethyl oxyisobutyrate | 400 |
| Alcohol | |

It will be understood that the above examples are merely illustrative and that the present invention comprises within its scope compositions generally in which a polyvinyl acetal resin forms the base and the ether derivatives herein described are used as modifying agents. The polyvinyl acetal resin may be varied widely with respect to the aldehyde employed to react with the polyvinyl alcohol and the extent of hydrolysis of the polyvinyl ester to form the alcohol and the extent of reaction of the aldehyde with the polyvinyl alcohol.

As will be obvious to those skilled in the art, the proportion of the herein described ether derivatives to be used may be varied widely. For use in plastic compositions adapted to form interlayer sheets for use in laminated glass, it is preferred that the ether derivative comprise 40-55% of the composition but these limits may be exceeded even in the production of laminated glass interlayers and, in the production of plastics for other purposes, will, of course, be varied to obtain the properties desired. These modifiers have the effect of conferring great toughness upon the polyvinyl acetal resins and are very advantageous in compositions for laminated glass interlayers as they not only add toughness to the interlayer sheets but also improve the cold break tests of laminated glass using such interlayers.

Interlayer sheets made of a plastic comprising a polyvinyl acetal resin and one of the herein described ether derivatives as a modifier or plasticizer therefor, may be bonded directly to glass without the aid of an auxiliary adhesive or, if desired, auxiliary adhesives may be employed.

As many apparently widely different embodiments of this invention may be made without departing from the spirit and scope thereof, it is to be understood that the invention is not limited to the specific embodiments thereof except as defined in the appended claims.

I claim:

1. A composition comprising a polyvinyl acetal resin and, as a modifier therefor, benzyl ether of ethyl lactate.

2. A composition comprising a polyvinyl formal resin and, as a modifier therefor, benzyl ether of ethyl lactate.

3. A safety glass interlayer sheet comprising a polyvinyl acetal resin and, as a modifier therefor, an ether derivative of an ester of a hydroxy monocarboxylic acid represented by the formula $R_1OR_2COOR_3$, wherein $R_1$ is a radical from the group consisting of aryl and aralkyl radicals containing not more than 10 carbon atoms, $R_2$ is a divalent hydrocarbon radical containing not more than 17 carbon atoms, and $R_3$ is a monovalent radical derived from a hydroxyl compound of the class consisting of alcohols and phenols containing not more than 18 carbon atoms, and the sum of carbon atoms of $R_2$ and $R_3$ does not exceed 25.

BARNARD M. MARKS.